Figure 1:
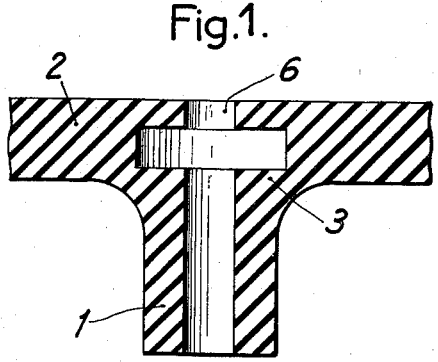

June 20, 1961 — C. DELACOSTE — 2,989,068
RESILIENT INFLATION VALVE
Filed Dec. 14, 1959

INVENTOR
Claude Delacoste
By
OSTROLENK, FABER, GERB & SOFFEN
ATTORNEYS

United States Patent Office 2,989,068
Patented June 20, 1961

2,989,068
RESILIENT INFLATION VALVE
Claude Delacoste, Paris, France, assignor to Societe a Responsabilite Limitee dite: Delacoste & Cie, Paris, France
Filed Dec. 14, 1959, Ser. No. 859,464
Claims priority, application France Dec. 15, 1958
1 Claim. (Cl. 137—223)

The present invention is concerned with valves and relates more particularly to a valve adapted to be fitted on any articles to be inflated such as bladders, inner tubes of tyres, pneumatic mattresses, buoys, footballs, and the like, this valve being also suitable for use as a retaining valve for preventing the escape of liquid or gas from a suitable container.

This valve is characterized in that it consists essentially of a resilient valve body separate from or formed integrally with the wall of the container to be obturated thereby, which comprises a tubular portion disposed internally of the container and connected in a fluid-tight manner to its wall, and a shank so engaged in said tubular portion that the elastic contraction of the tubular portion on the shank will close the container in a fluid-tight manner, means being also provided in said valve body and on said shank whereby the shank is constantly retained in position in the valve body, the gas delivered under pressure into said valve body, notably for inflating the container, penetrating as far as the upper portion of the head of said shank, inside said valve body, without applying this head against said valve body, and reaching the upper portion of said tubular portion of the valve body so as to resiliently expand this portion relative to the shank surrounded thereby and therefore enable the compressed gas to penetrate into the container and inflate same.

To this end, the metal shank may comprise a suitably shaped head for example a disc-shaped head, and the upper portion of the valve body may comprise a hollow portion of corresponding configuration which communicates with the outside through an adequate aperture permitting the ingress of the compressed fluid, a transverse notch being also provided in the outlet face of the metal shank to permit the passage of said compressed fluid towards said resiliently deformable portion of the valve body.

Figure 2:
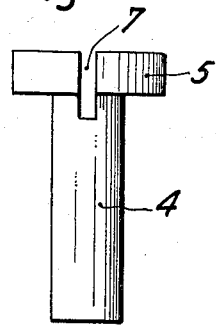
Figure 3:
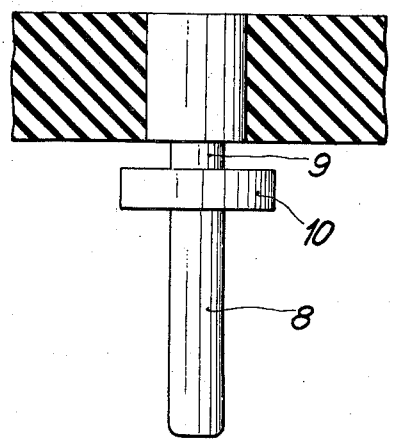

In order to afford a clearer understanding of this invention and of the manner in which the same may be carried out in practice, reference will now be made to the attached drawing forming part of this specification and illustrating diagrammatically, by way of example, a typical form of embodiment of the present invention. In the drawing:

FIGURE 1 is an axial section showing the valve body.
FIGURE 2 is an elevational view of the valve member fitting in the body of FIG. 1; and
FIGURE 3 is an elevational view showing a mandrel suitable for molding the valve body illustrated in the preceding figures.

The valve illustrated in the drawing comprises a tubular portion 1 of resilient material connected to the wall 2 of the container through an intermediate hollow portion 3.

Fitted in the tubular portion 1 is a cylindrical shank 4 formed with an integral flat head 5. The intermediate portion 3 comprises a cavity corresponding in shape to the aforesaid head 5 and having its bottom connected directly to the axial passage of the tubular portion 1, its top being connected through an orifice 6 to the atmosphere, this orifice 6 being formed in the outer wall 2 of the container. The head of the metal shank has a transverse or diametral notch 7 formed therein, this notch extending if desired also through the upper end of the cylindrical portion of said shank.

It is clear that when the container is inflated the pressure exerted by the compressed gas against the wall 2 presses the tubular portion 1 of the valve body against the shank 4, thus closing the container in a fluid-tight manner; if the delivery end of a pump or tyre-inflator is applied against the orifice 6 and a compressed gas is forced inwardly through this orifice 6, the gas will firstly flow through the orifice 6 and notch 7 and then reach the upper portion of the tubular portion 1, and it is evident that if the delivery pressure is sufficient the gas will slightly and resiliently expand the walls of shank 4 and finally penetrate into the container.

This valve body may be molded by applying to this end a mandrel for example of the type shown in FIG. 3 and comprising a shank 9 of same diameter as the orifice 6, and a flange or head 10 of same diameter as the head 5 of shank 4.

It will be readily appreciated that a valve of this character, the fluid-tightness of which results only from the elastic pressure exerted by the tubular portion 1 of the valve body against the shank 4, is extremely cheap to manufacture for the valve body may be molded in a single operation, without any difficulty, whilst the complementary member consisting of the shank 4 with its head 5, of metal or suitable plastic material, is also very cheap since it may even be selected among existing articles or mechanical parts, for example a simple rivet the head of which is punched or milled to form the notch 7 therein.

The molded piece may be stripped without difficulty by extracting this piece which allows the flange or disc 10 of the mandrel to pass through the orifice 6 formed in the molded piece, due to the elastic deformation of the material utilized for the molding operation; the shank 4 and its head 5 are fitted in the same manner through the orifice 6.

Of course, the form of embodiment of the valve which is shown and described herein should not be construed as limiting the present invention for many modifications may be brought thereto without departing from the spirit and scope of the invention as set forth in the appended claim. Thus, other means and arrangements may be contemplated for enabling the compressed gas to flow around the head of the shank 4 from the inlet orifice 6 to the tubular portion of the valve body.

What I claim is:

A valve for a container adapted to be inflated, comprising an elastic valve body, said valve body comprising a tubular portion and a radially outwardly extending flange portion on one end, a shank engaged in the bore of said tubular portion so that the elastic contraction of said tubular portion on said shank will close said bore in a fluid-tight manner, said shank comprising a head of disc-like configuration, said flanged end providing a groove around said bore, said groove having a shape corresponding to said head so as to contain same, and a notch formed through said head to permit the passage of the fluid under pressure through said bore.

References Cited in the file of this patent
FOREIGN PATENTS
19,809    Great Britain _____ Aug. 30, 1912
452,128   Italy _____ Oct. 10, 1949